US008372789B2

(12) United States Patent
Harris et al.

(10) Patent No.: US 8,372,789 B2
(45) Date of Patent: Feb. 12, 2013

(54) METHODS OF DESIGNING TREATMENT FLUIDS BASED ON SOLID-FLUID INTERACTIONS

(75) Inventors: Phillip C. Harris, Duncan, OK (US); Stanley J. Heath, Duncan, OK (US); Harold G. Walters, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 934 days.

(21) Appl. No.: 12/321,315

(22) Filed: Jan. 16, 2009

(65) Prior Publication Data

US 2010/0181070 A1    Jul. 22, 2010

(51) Int. Cl.
  *E21B 43/267* (2006.01)
  *G01N 31/00* (2006.01)
  *G01N 11/00* (2006.01)
(52) U.S. Cl. ........ 507/269; 507/204; 507/211; 507/213; 507/214; 507/216; 507/217; 507/219; 507/221; 507/223; 507/225; 507/271; 507/272; 507/273; 166/280.1; 436/163; 73/54.01
(58) Field of Classification Search .................. None
See application file for complete search history.

(56) References Cited

U.S. PATENT DOCUMENTS

| 3,026,938 | A | 3/1962 | Huitt et al. | |
|---|---|---|---|---|
| 3,376,930 | A | 4/1968 | Kiel et al. | |
| 5,311,946 | A | 5/1994 | Harry et al. | |
| 6,488,091 | B1 | 12/2002 | Weaver et al. | 166/300 |
| 6,782,735 | B2 | 8/2004 | Walters et al. | 73/52.28 |
| 7,275,596 | B2* | 10/2007 | Willberg et al. | 166/280.1 |
| 7,392,842 | B2 | 7/2008 | Morgan et al. | 166/250.1 |
| 2007/0079961 | A1* | 4/2007 | Morgan et al. | 166/250.1 |
| 2007/0144736 | A1 | 6/2007 | Shinbach et al. | |

FOREIGN PATENT DOCUMENTS

| EP | 0 542 397 A2 | 5/1993 |
|---|---|---|
| WO | WO 2006/116868 A1 | 11/2006 |
| WO | WO 2006/116868 A8 | 11/2006 |

OTHER PUBLICATIONS

Publication for PCT/GB2010/000060 dated Sep. 10, 2010.
International Search Report and Written Opinion for PCT/GB2010/000060 dated Jul. 12, 2010.
Search Report for International Patent Application No. PCT/GB2010/000060 dated Apr. 12, 2010.

* cited by examiner

*Primary Examiner* — John J Figueroa
(74) *Attorney, Agent, or Firm* — Robert A. Kent; McDermott Will & Emery LLP

(57) ABSTRACT

Methods that comprise selecting proppant for use in a fracturing fluid based on one or more factors, wherein the one or more factors comprise an interaction between the proppant and the fracturing fluid. Methods that comprise designing a treatment fluid that comprises a gelled base fluid and a particulate based on one or more factors, wherein the one or more factors comprise an interaction between the particulate and the gelled base fluid.

17 Claims, 12 Drawing Sheets

METHODS OF DESIGNING TREATMENT FLUIDS BASED ON SOLID-FLUID INTERACTIONS

BACKGROUND

The present invention relates to subterranean treatment fluids and, more particularly, in some embodiments, to methods of designing treatment fluids based on solid-fluid interactions.

A wide variety of fluids may be used in subterranean operations, including, but not limited to, drilling fluids, cement compositions, completion fluids, and fracturing fluids. The fluids may be introduced into a well bore in accordance with known techniques. It may be desirable to know various characteristics of the fluids to determine how the fluids will act upon being introduced into the well bore.

Some fluids used in subterranean operations may carry particulate, and it is typically desired for the fluids to support the particulate in suspension for at least some period of time. In other words, the particulate should, for example, be dispersed throughout the fluid during at least part of the time the fluid is used in the well bore. For example, a fracturing fluid may include a gelled base fluid and a quantity of a particulate (e.g., proppant). One example of a suitable proppant is sand. The gelled base fluid generally supports the proppant such that the proppant is suspended in the fluid during the time the fracturing fluid is introduced into the well bore. The fracturing fluid may be introduced into the formation at a hydraulic pressure sufficient to create or enhance at least one or more fractures in the formation. Enhancing a fracture includes enlarging a natural or preexisting fracture in the formation. Thereafter, the fluid may be recovered from the well bore with the proppant remaining in the fracture. The proppant are thought to prevent the fractures from fully closing upon the release of hydraulic pressure, forming conductive channels through which fluids may flow to a well bore to ultimately be produced.

In general, fracturing fluids may be designed to have sufficient viscosity to generate fracture geometry and transport proppant. Accordingly, fracturing fluids may be subjected to extensive testing on high-temperature rheometers to ensure that they have sufficient viscosity for performing the intended purpose and break within a suitable timeframe for the application. Slurry viscometers may also be used, for example, to indicate time periods during which the fracturing fluid is supporting proppant in suspension and when the proppant has settled. In fluid design, it has generally been assumed that proppant has a negligible effect on fluid properties and that all proppants of a given mesh size and density will be transported equally.

SUMMARY

The present invention relates to subterranean treatment fluids and, more particularly, in some embodiments, to methods of designing treatment fluids based on solid-fluid interactions.

An embodiment of the present invention comprises a method that comprises selecting proppant for use in a fracturing fluid based on one or more factors, wherein the one or more factors comprise an interaction between the proppant and the fracturing fluid.

Another embodiment of the present invention comprises a method that comprises designing a treatment fluid that comprises a gelled base fluid and a particulate based on one or more factors, wherein the one or more factors comprise an interaction between the particulate and the gelled base fluid.

Another embodiment of the present invention comprises a method that comprises preparing two or more test fluids, wherein a first test fluid comprises a first particulate, and wherein a second test fluid comprises a second particulate; quantitatively determining settling time of the first particulate in the first test fluid; quantitatively determining the settling time of the second particulate in the second test fluid; comparing the settling time of the first particulate and the settling time of the second particulate to determine solid-fluid interactions in the first and second test fluids; and designing a treatment fluid at least partially based on the comparing of the settling times.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF THE PREFERRED EMBODIMENTS

Figure 1:
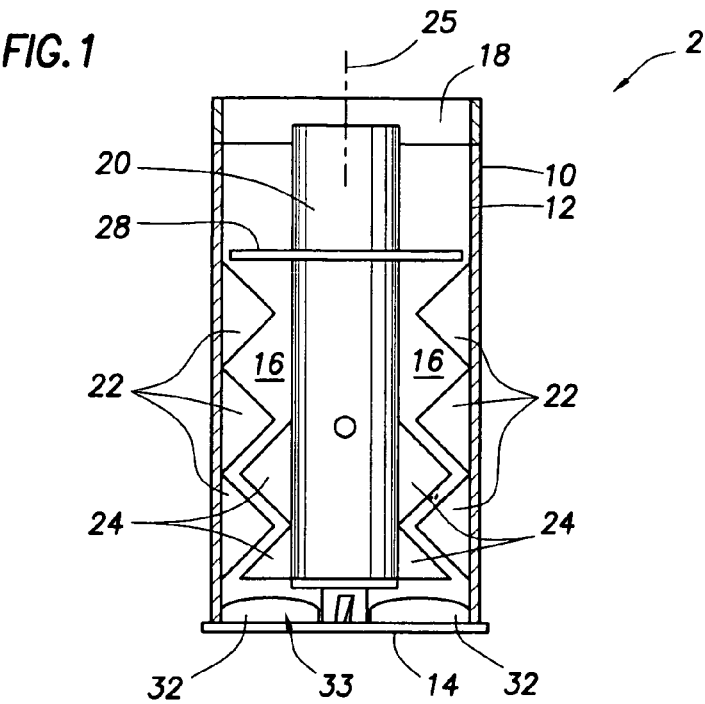
FIG. 1 illustrates a slurry viscometer used in making the proppant transport measurements in the examples portion of this application.

The present invention relates to subterranean treatment fluids and, more particularly, in some embodiments, to methods of designing treatment fluids based on solid-fluid interactions. Of the many advantages of embodiments of the present invention, many of which are not mentioned or alluded to herein, is the ability to measure solid-fluid interactions in a gelled fluid, thereby taking into account such interactions when designing a treatment.

One factor in the design of treatment fluid is viscosity. For example, fracturing fluids should have a sufficient viscosity to transport proppant to the desired location in the fracture. Previously, it was assumed that the particulates would have negligible effect on fluid properties, and that all material of a given mesh size and density would be transported equally. However, a problem was noted in the performance of commercial stimulation treatments containing certain proppants. In some instances, treatments containing certain proppants were screening out more frequently than when other proppants were used. A screenout is when the solids carried in a treatment fluid, such as proppant in a fracturing fluid, create a bridge as a result of particle settling in the fluid across the perforations or similar restricted area. This creates a sudden and significant restriction to fluid flow that causes a rapid rise in pump pressure.

To evaluate the effect of the proppants, tests were performed on a slurry viscometer. It was discovered that not all proppant of the same nominal size and density were transported equally in a gelled fluid. In general, the analysis did not fit the expected trend that bigger proppant would settle faster. By use of the slurry viscometer, it was determined that proppant surfaces were interacting with fluid components, which may cause changes in the rate of breaking and in elastic properties of the fluids. It is believed that the slurry viscometer allows the detection of solid-fluid interactions that could not previously be detected. It is also believed that the nature of the interactions likely depends on the surface composition of the solids and causes heterogeneous catalysis of the oxidizing breakers. Certain coatings (e.g. hydrophobic tackifying substances) should be able to deactivate the proppant surfaces, minimizing solid-fluid interactions, in accordance with embodiments of the present invention. Moreover, resin-coated sands (such as resins that are not fully cured) also may contain compounds that result in solid-fluid interactions. By way of example, certain compounds in the resin may accelerate decomposition of oxidizing breakers and cause rapid settling of the particulate.

Solid-fluid interactions may be determined in accordance with any of a variety of suitable techniques. By way of example, solid-fluid interactions may be determined by evaluating the settling time of a particulate in a gelled test fluid, by analyzing pH changes in gelled test fluids, or by analyzing thermal or viscous changes in a gelled test fluid. To evaluate settling times, two or more gelled test fluids may be prepared in accordance with one embodiment of the present invention. Each of the gelled test fluids may comprise a gelled base fluid and a particulate. The gelled base fluid may comprise, for example, water, a gelling agent (e.g., polymer), crosslinking agents, pH control agents, surfactants, breakers, and the like. In certain embodiments, the particulates included in each test fluid may be within a specified size range. By way of example, the particulates may have the same nominal mesh size. In certain embodiments, the particulate may be coated with a resin. In certain embodiments, the particulates may be coated with a tackifying agent.

After preparation of the gelled test fluids, the settling time of the particulate in each test fluid may be quantitatively determined. In accordance with one embodiment of the present invention, the settling time may be quantitatively determined by use of a slurry viscometer. Examples of suitable slurry viscometers are described in more detail in U.S. Pat. No. 6,782,735 and U.S. Pat. No. 7,392,842, the disclosures of which are incorporated herein by reference. In general, the slurry viscometer may comprise a viscometer cup that include an axial shaft disposed within the cup when a fluid to be tested is in the cup, at least one projection extending laterally outward from the axial shaft of the viscometer, and at least one projection extending laterally inward from an inner surface of the viscometer cup, wherein the projections effect stirring of the fluid in the cup in response to rotation of at least one of the cup or the axial shaft of the viscometer. Moreover, the viscometer for the slurry viscometer generally may comprise projections (e.g., pennants, flags, fins, or blades) that function to provide vertical lift and/or homogenization of the particulate while in the gelled test fluid when sufficient rotational speed is applied. The number, angle, curvature, and spacing of these projections can be designed so as to provide suspension or allow settling under volume average shear rates similar to fracture transport in well fracturing procedures. An example shear range may be about 1 to about 100 l/sec. The slurry viscometer may be calibrated with silicone oils for viscosity ranges provided by a conventional couette viscometer, such as a Fann model 50 viscometer. The particular slurry viscometer used in making the measurements described herein is described in more detail below.

Once the settling times have been quantitatively determined, the settling times may be compared to determine solid-fluid interactions in the different gelled test fluids. For example, particulates of the same nominal size and density may not have the same settling rates in the gelled test fluids. It is believed that the particulate surfaces may interact with components of the gelled test fluids, causing changes in rates of breaking and elastic properties of the fluids. It is believed that the nature of these interactions may depend, for example, on the surface composition of the particulates. The surface composition of the particulates may cause, for example, heterogeneous catalysis of the oxidizing breakers that may be included in the gelled test fluid. By way of example, ceramic materials are believed to catalyze the decomposition of oxidizing breakers, speeding up the reduction of gel viscosity, resulting in faster settling of ceramics than sand. In general, ceramic materials may have aluminate-silicate, aluminum oxide, and silicon oxide surfaces that may become activated during their manufacture and also may have higher surface area than sand. In addition, iron or other transition metal may be present in the ceramic surface composition.

Based on the solid-fluid interactions between the particulate and the gelled test fluid, a treatment fluid may be designed. For example, the solid-fluid interactions may be used as a factor in the selection of the particular particulate that may be included in the treatment fluid. In this manner, interactions between the particulate and the gelled test fluid may be taken into account in the treatment fluid design. By way of example, while ceramic materials may have certain advantages of strength or availability over sand, the ceramic materials may result in undesirable solid-fluid interactions. In accordance with embodiments of the present invention, ceramic materials may be coated with a hydrophobic tackifying substance to deactivate its surface, minimizing solid-fluid interactions. Microemulsion additives may also be included in the gelled fluids where the tackifying substance is used. It is believed that the microemulsion additive may temporarily reduce the tackiness of the substance, resulting in less agglomeration of the coated particles while still having a reduction in solid-fluid interactions. In accordance with another embodiment of the present invention, a more inert material may be selected for use based on the detected solid-fluid interactions. In addition, designing the fluid may include changing the concentration and/or type of oxidizer, catalyst, gelling agent, crosslinking agent, or any other additive in the fluid.

As described above, embodiments of the present invention may be used to design a treatment fluid that comprises a gelled base fluid and a particulate. In certain embodiments, the particulate may be a proppant included in the fluid to prevent the fractures from fully closing upon the release of hydraulic pressure in fracturing operations. Examples of treatments fluids include, but are not limited to, fluids introduced into a well bore during drilling, completion, or stimulation operations, such as drilling fluids, cement compositions, completion fluids, gravel packing fluids, workover fluids, and fracturing fluids.

Particulates that may be included in the treatment fluids may comprise any material suitable for use in subterranean operations. Suitable particulate materials include, but are not limited to, sand, bauxite, ceramic materials, glass materials, polymer materials, TEFLON® (polytetrafluoroethylene) materials, nut shell pieces, seed shell pieces, cured resinous particulates comprising nut shell pieces, cured resinous particulates comprising seed shell pieces, fruit pit pieces, cured resinous particulates comprising fruit pit pieces, wood, composite particulates, and combinations thereof. Suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, polymers and combinations thereof. Typically, the particulates have a size in the range of from about 2 to about 400 mesh, U.S. Sieve Series. In particular embodiments, preferred particulates size distribution ranges are one or more of 6/12 mesh, 8/16, 12/20, 16/30, 20/40, 30/50, 40/60, 40/70, or 50/70 mesh. It should be understood that the term "particulate," as used in this disclosure, includes all known shapes of materials including substantially spherical materials, fibrous materials, polygonal materials (such as cubic materials) and mixtures thereof. Moreover, fibrous materials that may or may not be used to bear the pressure of a closed fracture are often included in proppant and gravel treatments.

The gelled base fluid may include aqueous gels, viscoelastic surfactant gels, oil gels, and foamed gels. Suitable aqueous gels may comprise water and a gelling agent. Foams may be created by the addition of a gas, such as air, methane, carbon dioxide or nitrogen. In certain embodiments, the gelled base fluid may be an aqueous gel that comprises water, a gelling agent for gelling the water and increasing its viscosity, and, optionally, a crosslinking agent for crosslinking the gel and further increasing the viscosity of the fluid. The increased viscosity of the gelled, or gelled and cross-linked, fluid, inter alia, reduces fluid loss and allows the treatment fluid to transport significant quantities of suspended particulates. The water used to form the treatment fluid may be fresh water, salt water, brine, sea water, or any other aqueous liquid that does not adversely react with the other components. The density of the water can be increased to provide additional particulate transport and suspension in accordance with embodiments of the present invention.

Suitable gelling typically may comprise polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose, and xanthan and diutan polymers. This method could also be used with surfactant gel fluids. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091, disclosure of which is incorporated herein by reference. Suitable gelling agents generally are present in the gelled base fluids of the present invention in an amount in the range of from about 0.1% to about 5% by weight of the water therein. In certain exemplary embodiments, the gelling agents are present in the gelled base fluids of the present invention in an amount in the range of from about 0.01% to about 2% by weight of the water therein.

Crosslinking agents may be used to crosslink gelling agent molecules to form crosslinked gelling agents. Crosslinkers typically comprise at least one ion that is capable of crosslinking at least two gelling agent molecules. Examples of suitable crosslinkers include, but are not limited to, boric acid, disodium octaborate tetrahydrate, sodium diborate, pentaborates, ulexite and colemanite, compounds that can supply zirconium IV ions (such as, for example, zirconium lactate, zirconium acetate lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate);

antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan Okla. Suitable crosslinkers generally are present in the gelled base fluids of the present invention in an amount sufficient to provide, inter alia, the desired degree of crosslinking between gelling agent molecules. In certain embodiments of the present invention, the crosslinkers may be present in an amount in the range from about 0.001% to about 10% by weight of the water in the gelled base fluid. In certain embodiments of the present invention, the crosslinkers may be present in the gelled base fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked base fluids may also include internal delayed gel breakers such as enzyme, oxidizing, acid buffer, or temperature-activated gel breakers. The gel breakers cause the gelled base fluids to revert to thin fluids that can be produced back to the surface, for example, after they have been used to place proppant in subterranean fractures. The gel breaker used may be present in the gelled base fluid in an amount in the range of from about 0.5% to about 10% by weight of the gelling agent. The gelled base fluids may also include one or more of a variety of additional additives, such as gel stabilizers, fluid loss control additives, clay stabilizers, bactericides, and the like.

As described above, a slurry viscometer was used in making the measurements described in the example portion of this application. The particular slurry viscometer used in making these measurements is illustrated in FIG. 1.

Referring to FIG. 1, the slurry viscometer 2 includes a slurry cup 10 that is adapted to be used with a conventional viscometer of the high-pressure, high-temperature type. The slurry cup 10 has a cylindrical side wall 12 extending from an end closed by a bottom wall 14 to an open end opposite the bottom wall 14. The side wall 12 and the bottom wall 14 have inner surfaces defining a cavity 16 in the slurry cup 10. The cavity 16 receives the fluid to be tested. This cavity 16 provides a single continuous volume or cell for the fluid to be tested.

As illustrated in FIG. 1, the slurry viscometer 2 also includes means for closing the open end of the cavity 16 or slurry cup 10 after the fluid is placed in the cavity 16. This closing means completes the definition of the outer boundaries of the continuous test chamber which can be pressurized above atmospheric pressure. In the illustrated embodiment, the closing means includes a conventional pressure sealed end closure 18 for the slurry cup 10. The closing means also includes a support, which in the FIG. 1, is an axial shaft, or axial support 20. This axial support 20 hangs below the end closure 18 into the slurry cup 10 when the end closure 18 is connected to the slurry cup 10 in conventional manner to close the slurry cup 10. One example of the end closure 18 and the axial support 20 is found in the aforementioned Fann model 50 viscometer; however, other high-pressure, high-temperature devices can be used (and as mentioned, the present invention has application with devices that need not have high pressure or high-temperature capability, such as an open-cup viscometer). It is to be understood that the slurry cup 10 also may include, but is not required to include, a means for closing the open end thereof.

The slurry viscometer 2 shown in FIG. 1 further includes means for stirring fluid in the test chamber such that particulate in the fluid may be suspended in the fluid during one period of time of the stirring but is not suspended in the fluid during another period of time of the stirring. This may be implemented by at least one projection extending into the cavity 16 from the inner surface of the slurry cup 10. In the embodiment shown in FIG. 1, a plurality of substantially triangular metallic projections 22 are connected to the inner surface of the slurry cup 10. Connection can be by any suitable means, including but not limited to welding to or integrally machining with the side wall 12. In other embodiments, a single projection 22 or different numbers of projections 22 can be used.

The slurry viscometer 2 of FIG. 1 also includes a plurality of projections 24 extending laterally outward from the axial support 20. Projection 24 can be of the same or similar type and shape projection 22 and may be connected to the axial support 20 illustrated in the embodiment of FIG. 1. In certain embodiments, there is an even number of these projections 24. Connection can be by any suitable means, including but not limited to welding to or integrally machining with the axial support 20 or a mandrel that connects to the axial support 20.

The projections 22, 24 may be large enough to generate a torque during stirring about axis 25, but small enough to produce a torque reading within a desired range (the larger the projections, the larger the torque reading) and to leave a gap between the set of projections 22 and the set of projections 24 sufficient for the particulate material to pass through without bridging (e.g., three to four particle diameters) when the slurry cup 10 and support 20 are rotated relative to each other. As shown in FIG. 1, projections 22 and 24 can be flat with planar surfaces.

The projections 24 operatively cooperate with the projections 22 to effect stirring of fluid in the slurry cup 10 in response to rotation of at least one of the slurry cup 10 or axial support 20. The slurry cup 10 may be rotated so that the projections 22 principally effect the stirring, and the projections 24 are deflected in response to thereby sense torque. This rotation is achieved in conventional manner within the remainder of the viscometer used to implement the described embodiment of the present invention. The rotation may also be obtained in a manner that permits an appropriate readout signal to be generated. Such rotation may be within the range between one revolution per minute and one thousand revolutions per minute.

In the illustrated embodiment, the slurry viscometer 2, also includes a flat disk or annular ring 28 mounted on the axial support 20. The ring 28 is positioned above the projections 24. Annular ring 28 performs the functions of minimizing air or nitrogen entrainment and minimizing rod climbing. Without this ring, gas could be entrained into the fluid, and foam created during measuring can result in errors in torque reading. Also the foam may expand when the pressure is relieved at the end of the test. It may go into the closure means 18 of the instrument creating extensive cleanup and maintenance problems. Elastic fluids may exhibit the rod climbing effect (also known as the Weissenberg effect) and crosslinked fluids are usually elastic. If the fluid is allowed to climb out of the measurement area, then errors in torque measurement may occur.

As illustrated in FIG. 1, one or more vanes or projections 32 may be mounted to extend generally upward from the bottom wall 14. In certain embodiments, the vanes or projections 32 may have curved or sloped surfaces 33 for directing fluid flow upward, so as to define an impeller on the bottom wall 14. For example, the vanes or projections 32 may be curved in an impeller shape and have a fluid contacting surface 33 that causes the fluid and particulate to flow axially upward away from the bottom wall 14. In this manner settling may be inhibited when the slurry cup 10 is rotated at a sufficient speed. While the vanes or projections 32 are illustrated as impeller shaped, it is anticipated that flat planar surfaced tabs, for example, could be used instead.

In the illustrated embodiment of slurry viscometer 2, the projections 22 extend along the height of the cylindrical wall 12 between the bottom wall 14 and the annular ring 28 to maintain some shear on the fluid toward the upper end. In particular, the upper ones of the projections 22 provide some shear force on the fluid in the upper portion of the cell, which may be helpful to stabilize borate fluids. In general, this design for the slurry viscometer may be helpful because borate gels require some imposed shear to maintain structure and some viscoelasticity, as static borate gels settle quickly, proppant can cascade settle in zero shear fluid.

To facilitate a better understanding of the present invention, the following examples of certain aspects of some embodiments are given. In no way should the following examples be read to limit, or define, the entire scope of the invention.

EXAMPLES

Example 1

Figure 2:
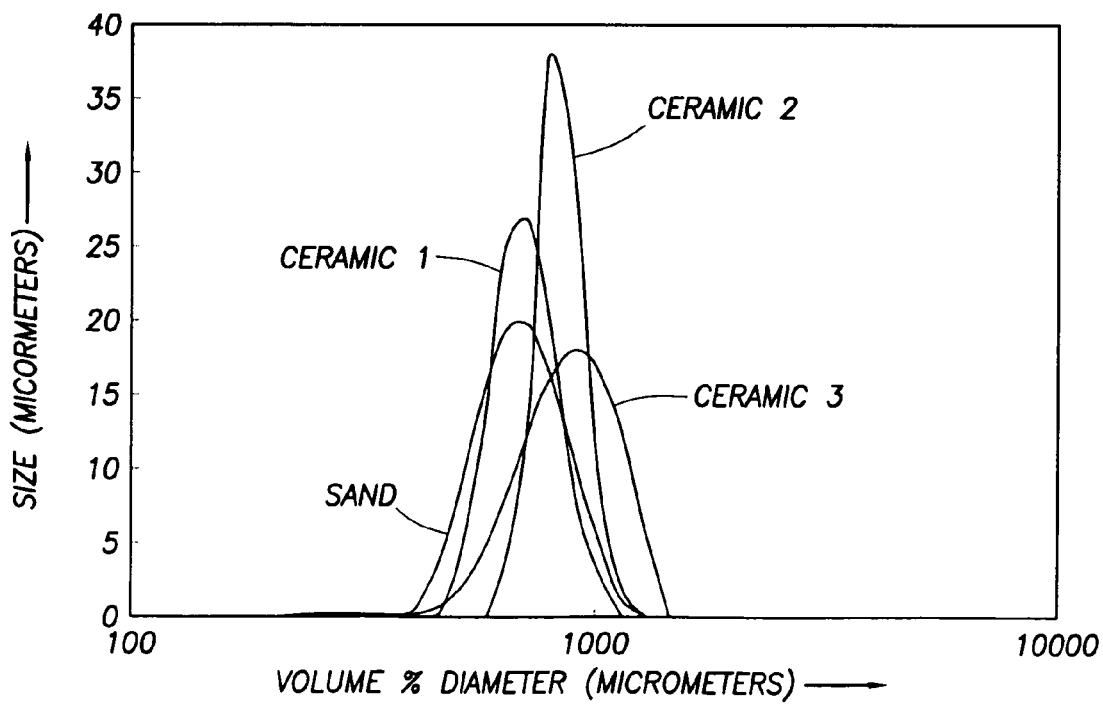
FIG. 2 is a graphical representation of the laser determination of the particle size distribution of nominal 20/40 mesh proppants of sand and ceramics 1, 2, and 3.

To evaluate solid-fluid interactions in treatment fluids, the following series of tests were performed. The proppant used in these tests comprised 20/40 mesh sand and three different ceramic proppants. Ceramic 1 was ECONOPROP® ceramic proppant, and Ceramic 2 was CARBOLITE® ceramic proppant, both available from CARBO Ceramics Inc. Ceramic 3 was VERSAPROP® proppant, available from Saint-Gobain Proppants. All of the proppants tested measured within the nominal 20/40 mesh range. Particle size distribution was measured by a Malvern Mastersizer 2000 laser analyzer. Particle size distributions from the laser analysis are shown in FIG. 2. The sand and ceramic 1 have virtually the same particle size distribution. Ceramic 2 has a similar distribution as ceramic 1, but with the distribution skewed to the larger size. Ceramic 3 had the largest mean diameter and the broadest size distribution.

Base gel fluids were mixed in a blender with buffer, salt, surfactant, and either guar, CMHPG, or xanthan polymer in water. A concentration of 9 pounds per gallon of proppant was added at moderately high speed with an overhead stirrer. Reactive additives, such as the boron crosslinker, oxidizing breaker, and a transition metal catalyst, were added following the sand while stirring. An attempt was made to maintain all gelled fluid properties the same between tests. Polymer, crosslinker, and oxidizing breaker concentrations were carefully controlled. Borate crosslinked fluid pH values were all similar, dropping from 10.3 before testing to 9.9 after testing on the slurry viscometer.

After full hydration, the viscosity of the 25 lb/Mgal guar base gel was 20 cP at 73° F., measured with a Fann Model 35 viscometer. The guar base gel had a pH of about 10.3 and comprised 25 lb/Mgal guar, 0.2% TMAC, 0.5 lb/Mgal of a boron crosslinker (ulexite), 0.07 lb/Mgal boric acid, 10 gal/Mgal of an oxidizing breaker, and 0.5 gal/Mgal CAT-3. The 45 lb/Mgal CMHPG base should be about 70 lb/Mgal. The oxidizing breaker was VICON NF™ fracturing fluid breaker, available from Halliburton Energy Services, Inc. CAT-3 is a breaker catalyst, available from Halliburton Energy Services, Inc. TMAC is a clay swelling inhibitor, CLAYFIX II, available from Halliburton Energy Services, Inc., Duncan, Okla.

After full hydration, the viscosity of the 70 lb/Mgal xanthan base gel should be about 58 cP. The xanthan base gel had a pH of about 9 and comprised 70 lb/Mgal xanthan, 0.8% NaCl, and 4 gal/Mgal of an oxidizing breaker. The oxidizing breaker was HT Breaker agent, available from Halliburton Energy Services, Inc.

After full hydration, the viscosity of the CMHPG base fluid should be about 41 cP. The CMHPG base gel had a pH of about 10.3 and comprised 45 lb/Mgal CMHPG, 0.45 gal/Mgal of a crosslinker, 15 lb/Mgal sodium thiosulfate, and 0.5 gal/Mgal of an oxidizing breaker. The crosslinker was CL-$_{37}$™ crosslinker, available from Halliburton Energy Services, Inc.

After preparation, the slurries were quickly transferred to the cup and placed on the slurry viscometer. The transferring process took about one minute. The cup was rotated at 25 rpm, giving an estimated volume average shear rate of 10 l/s. Settling Viscosity (Volume Average Viscosity was computed for a 420 spring where the settling viscosity equals (Torque-Prezero)* 3.2E3/rpm. Torque was monitored while the sample was heated to test temperature in a preheated bath at 200° F. Torque values were calculated and plotted as settling viscosity versus time.

Figure 3:
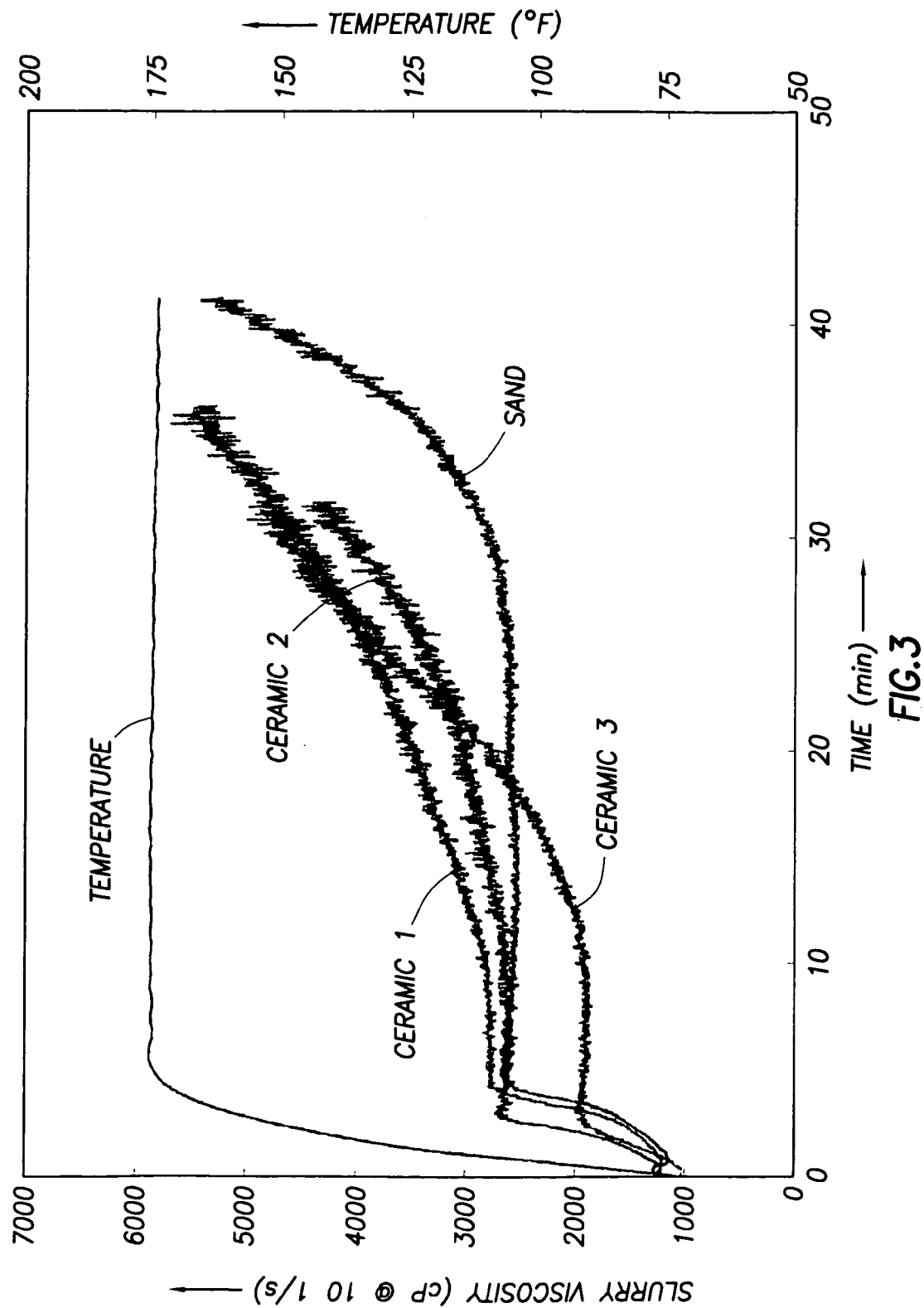
FIG. 3 is a graphical representation of the settling times measured with the slurry viscometer for a 70 lb/1,000 gal xanthan fluid and 9 lb/gal uncoated proppants of sand and ceramics 1, 2, and 3.

FIG. 3 shows curves from the slurry viscometer for a linear xanthan fluid containing each of the proppants. All of the proppants were transported similarly until the oxidizing breaker activated at about 50 minutes. There were small differences in settling rates for the three ceramics, but the biggest difference was in the extended transport (or longer settling time) for sand. Ceramics 1 and 2 had a specific gravity of 2.7. Ceramic 3 had a specific gravity of 3.5, so the actual proppant concentration was lower than the other three slurries. The lower particle concentration of ceramic 3 explains why the Slurry Viscosity of FIG. 3 was initially lower than the other slurries.

Figure 4:
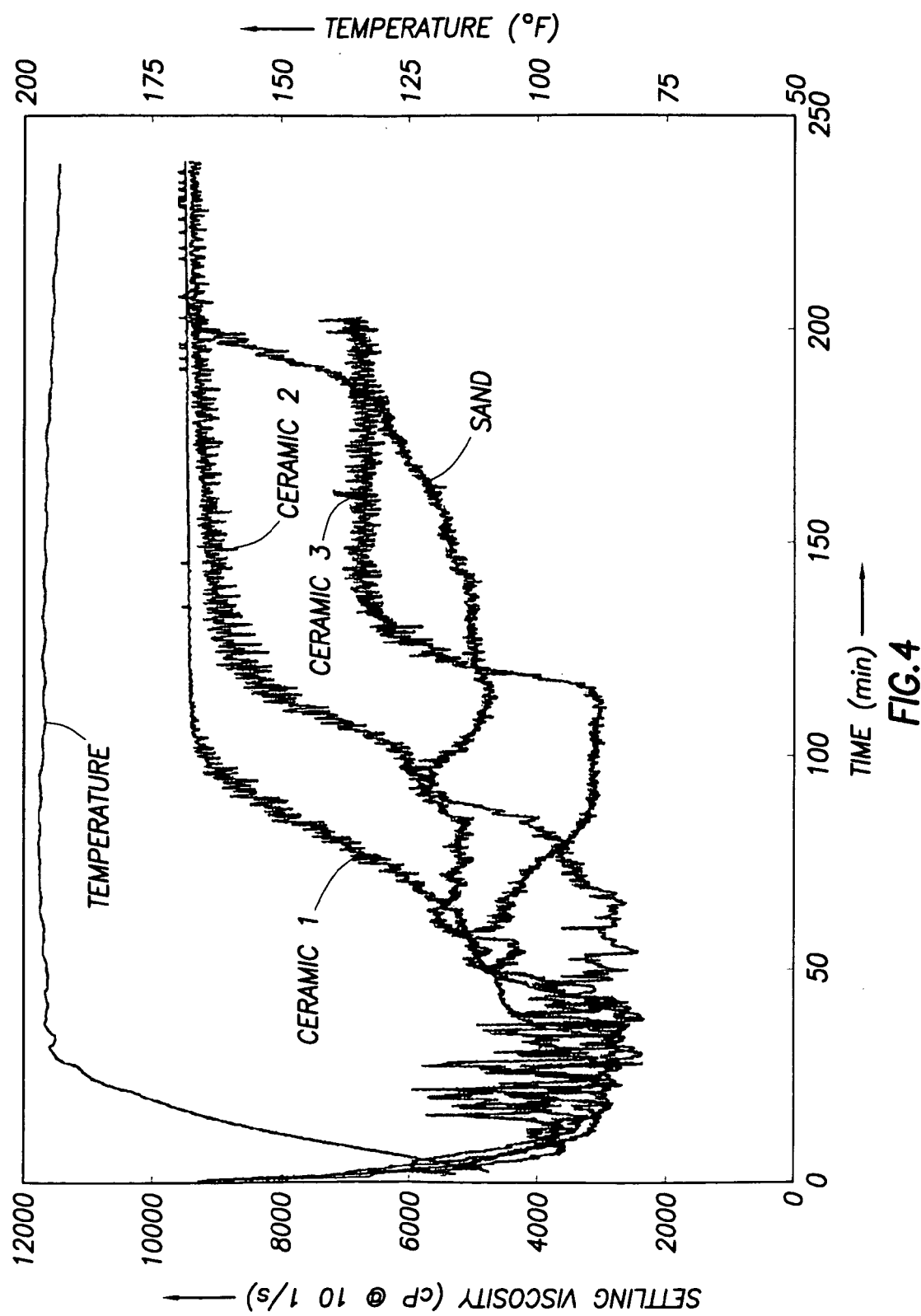
FIG. 4 is a graphical representation of the settling times measured with the slurry viscometer for a 25 lb/1,000 gal borate crosslinked guar fluid and 9 lb/gal uncoated proppants of sand and ceramics 1, 2, and 3.

FIG. 4 shows curves from the slurry viscometer for 25 lb/1000 gallon borate crosslinked guar with all four proppants. The order of settling times for the crosslinked gel was in the same order as in FIG. 3 for the linear gel. The qualitative trend of longer settling time for sand versus ceramic agreed with field observations of more frequent screenouts with ceramics.

Figure 5:
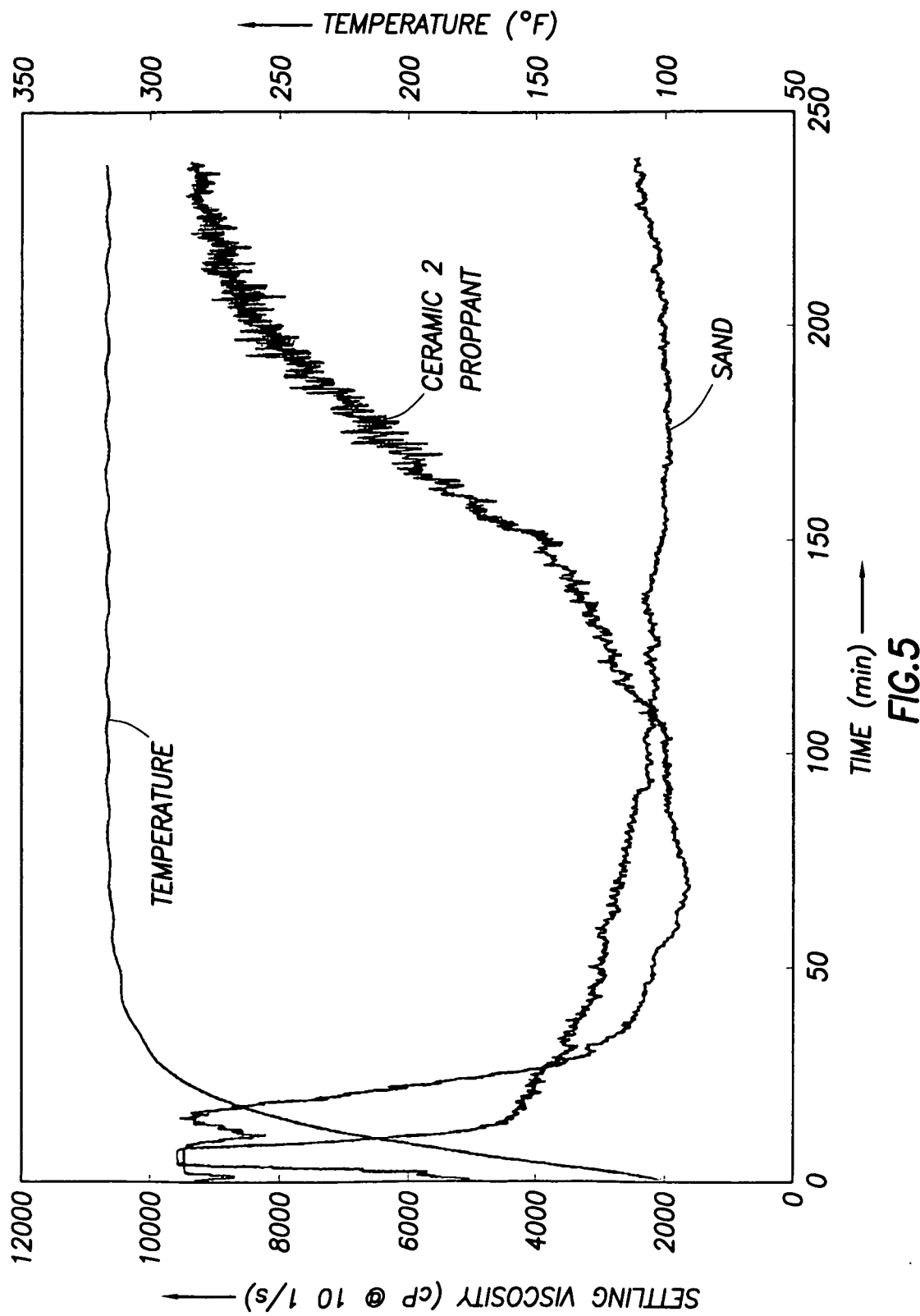
FIG. 5 is a graphical representation of the settling times measured with the slurry viscometer for a 45 lb/1,000 gal zirconate crosslinked CMHPG fluid and 9 lb/gal uncoated proppants of sand and ceramic 2.

FIG. 5 shows curves from the slurry viscometer for 25 lb/1,000 zirconate crosslinked CMHPG fluids with sand and ceramic 2.

FIGS. 3-5 show an initial time period where proppant is being transported elastically, followed by a point where the network structure has been degraded by a gel breaker, followed by an upward slope indicating settling in the viscous fluid. Even though the sand and ceramic 1 have essentially the same particle size distribution as illustrated by FIG. 2, the settling data from FIGS. 3-5 show the greatest different in settling times.

Figure 6:
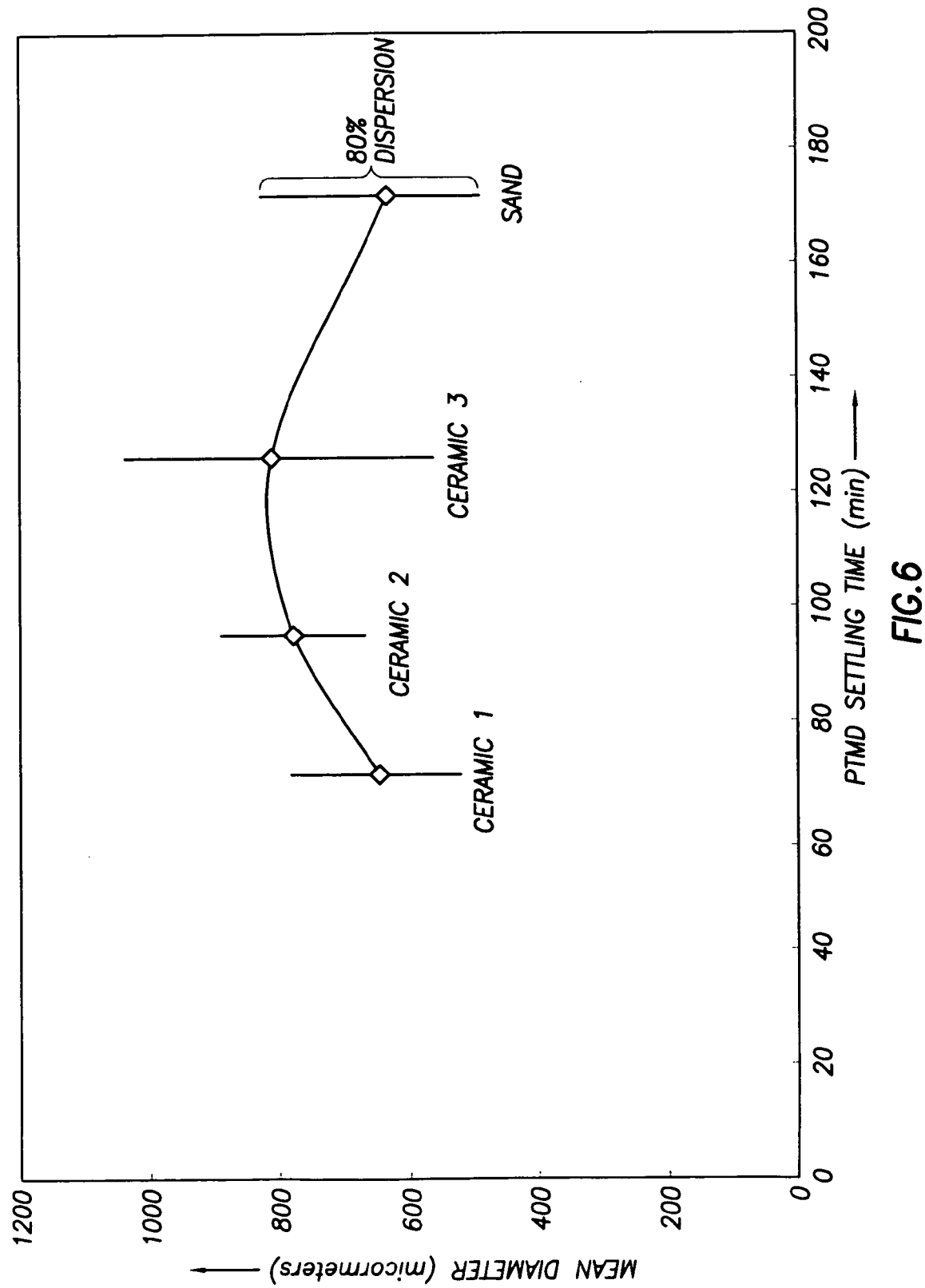
FIG. 6 is a graphical representation of the settling times measured with the slurry viscometer for the borate crosslinked guar fluid and 9 lb/gal uncoated proppants of sand and ceramics 1, 2, and 3 versus the mean diameter of the particle sizes for each proppant.

It would be expected to see a linear correlation for faster settling time with larger mean particle size. FIG. 6 provides a plot of proppant size versus settling time (the time Settling Viscosity reached 6000 cP) for the borate fluid of FIG. 4. As illustrated by FIG. 6, physical size alone does not control settling. The vertical dispersion line shows diameters where 80% of the proppant mass falls within the bounds of the line. All else being equal, it was believed that larger proppants should settle fastest, and the trend line would have been expected to have a negative slope. Instead, the line connecting the mean sizes of the different types of proppant is curved. Because a linear correlation was not shown, something other than physical properties might be causing the deviation, for example, chemical interactions.

Example 2

To evaluate whether surface characteristics of the proppant were influencing settling, scanning electron micrographs of the four proppants were prepared. From the scanning electron micrographs, it was observed that ceramic 1 and ceramic 2 have very similar surface characteristics. These two proppants are similar materials whose particle size distributions were skewed to the smaller and larger ends of the acceptable range within 20/40 mesh, respectively. Ceramic 3 is a slightly denser proppant material whose component fragments were apparently not fused as completely as those of ceramics 1 and 2. It was observed that ceramic 3 has a more porous surface that could act as a trap or an anchor for gel domains. Ceramic 3 released more fines than the other proppants when dispersed in the liquid. From the scanning electron micrographs, it was observed that the sand has a relatively smooth surface.

Differences in surface character from micrographs were not detected by the laser particle size analyzer, and no significant statistical differences in surface area were noted. Based on the micrographs, there is no clear trend in surface roughness or porosity that would correct the trend line of FIG. 6.

Example 3

To evaluate whether interactions between the gel fluid and the surface of the proppant were influencing settling, the following series of tests were performed. Sand may be comprised mainly of silicon oxides, and the ceramics are generally comprised of aluminum oxides, silicon oxides, and aluminum silicates. By way of example, interactions between the gel fluid and the proppant potentially could involve absorption of the polymer onto the surface of the proppant, or the borate crosslinker could potentially react with silicates to provide an attachment site, although such is not likely with aluminates. Another possible reaction is the oxidizing breaker with the different proppant surfaces to modify the decomposition rate.

In this series of tests, the surface of the different proppants was coated with a hydrophobic tackifying substance (HTS) to pacify them. The HTS used in these tests was SandWedge®, available from Halliburton Energy Services, Inc. Each proppant was coated with 3% by weight of the HTS by dry mixing. Thereafter, the settling tests were rerun on the slurry viscometer using the borate crosslinked fluid. The base gel was prepared as described above in Example 1.

Figure 7:
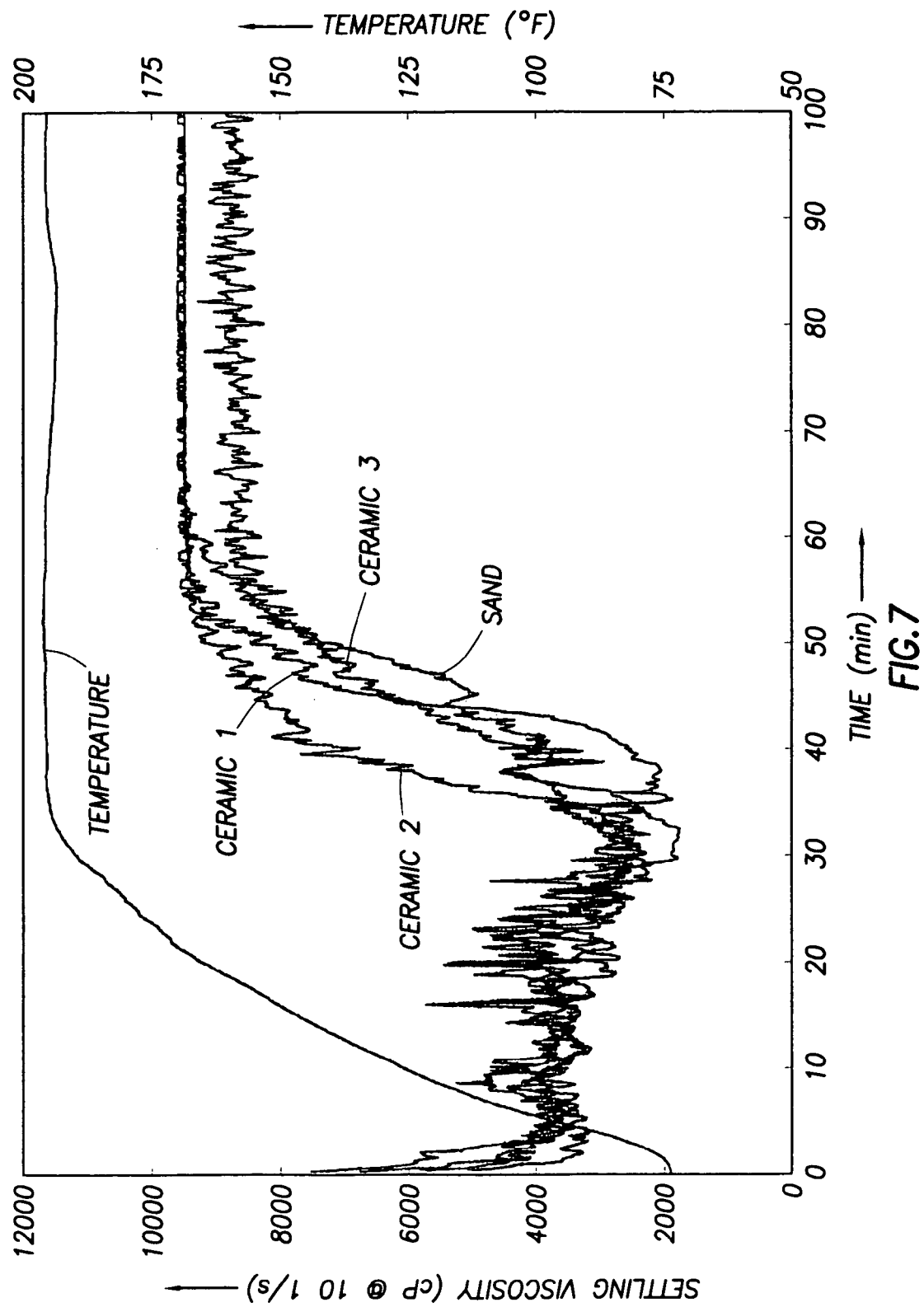
FIG. 7 is a graphical representation of the settling times measured with the slurry viscometer for a 25 lb/1,000 gal borate crosslinked guar fluid and 9 lb/gal proppants of sand and ceramics 1, 2, and 3 each coated with 3% hydrophobic tackifying substance.

FIG. 7 shows curves from the slurry viscometer for 25 lb/1000 gallon borate crosslinked guar with all four coated proppants. It was observed that the settling times for the coated proppants were much shorter than for uncoated proppants. It is believed that the more rapid settling was due to the tackiness of the HTS causing the proppants to agglomerate and function as a much larger unit.

Example 4

The short settling times of the coated proppant from Example 3 may be problematic as longer settling times may be desired for proppant placement in a fracture. To reduce the tackiness of the particles, a microemulsion additive (MEA) was added to the gel in an amount of 1 gallon per thousand gallons ("gpt"). The MEA additive was SSO-21™ additive, available from Halliburton Energy Services, Inc. However, after heating to 200° F. and washing with water, the proppant did not regain much, if any, of its original tackiness. Loss-on-ignition tests indicated that only 0.11% of the HTS coating remained after heating with 1 gpt MEA, which was apparently not sufficient to restore tackiness (see Table 1). The experiment was repeated with a minimum amount of MEA, i.e., 0.15 gpt, to just overcome initial tackiness at 75° F. After heating to 200° F. and thoroughly washing with water, the proppant regained its tackiness with 0.80% HTS remaining.

TABLE 1

| Before/After Heat | Sample Treatment | Loss On Ignition (%) |
|---|---|---|
| after heat | ceramic 1, HTS, 1.0 gpt MEA | 0.11 |
| before heat | ceramic 1, HTS, 0.15 gpt MEA | 0.96 |
| after heat | ceramic 1, HTS, 0.15 gpt MEA | 0.80 |
| before heat | Sand, HTS, 0.15 gpt MEA | 1.09 |
| after heat | Sand, HTS, 0.15 gpt MEA | 1.29 |

Accordingly, it was observed that a low concentration (0.15 gpt) of MEA allowed the HTS to regain its tackiness after water washing, while a higher concentration (1.0 gpt) of MEA completely disabled the tackiness property.

Figure 8:
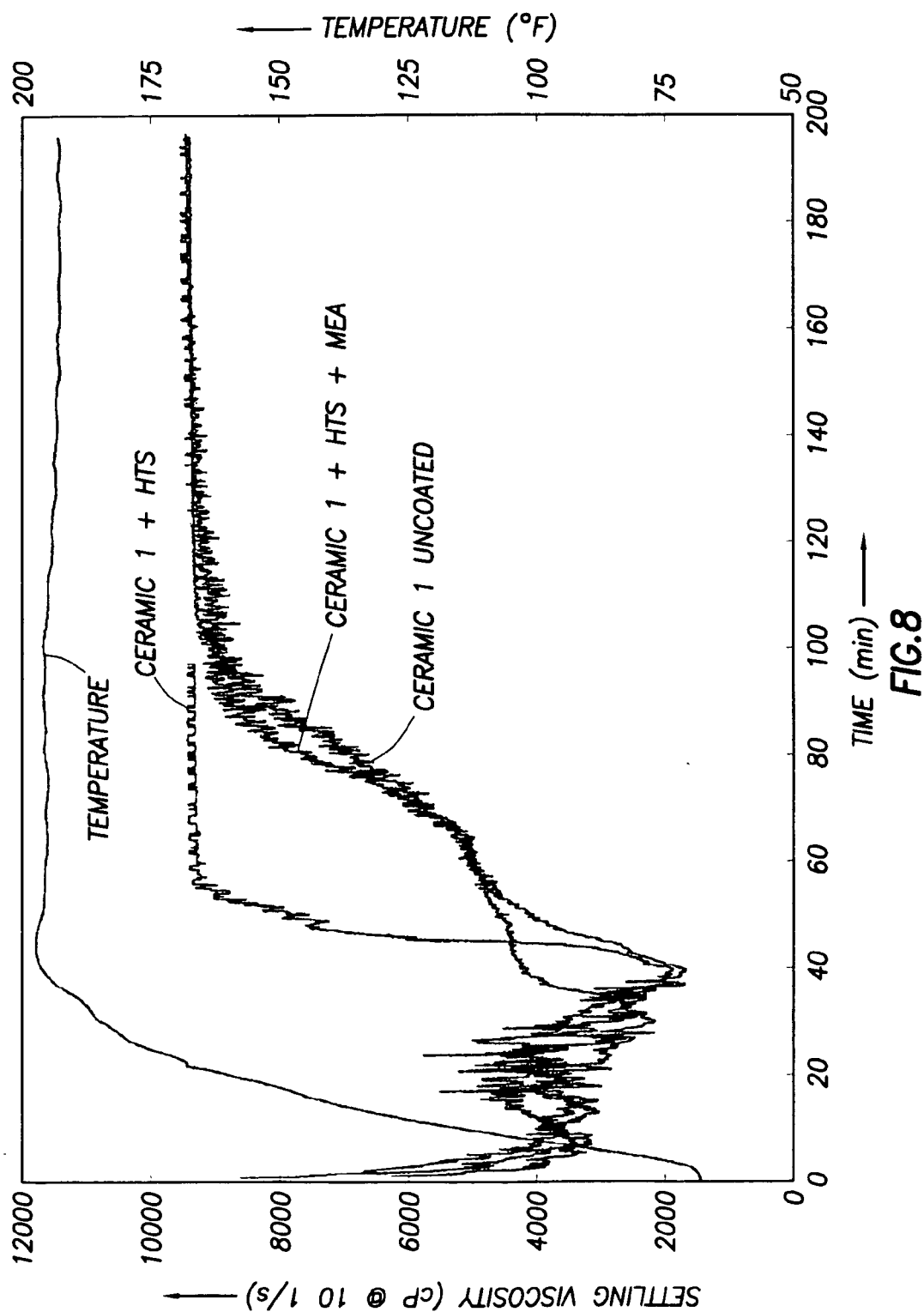
FIG. 8 is a graphical representation of the settling times measured with the slurry viscometer for a 25 lb/1,000 gal borate crosslinked guar fluid and 9 lb/gal proppants of uncoated ceramic 1, ceramic 1 coated with 3% hydrophobic tackifying substance, and ceramic 1 coated with 3% hydrophobic tackifying substance plus a microemulsion additive.

FIG. 8 shows curves from the slurry viscometer for 25 lb/1000 gallon borate crosslinked guar with ceramic 1 in its original state (i.e., uncoated), coated with HTS, and treated with MEA. As illustrated by FIG. 8, the proppant that was coated and deactivated, settled the same as the original proppant, indicating minimal chemical effects due to interaction with the fluid.

Figure 9:
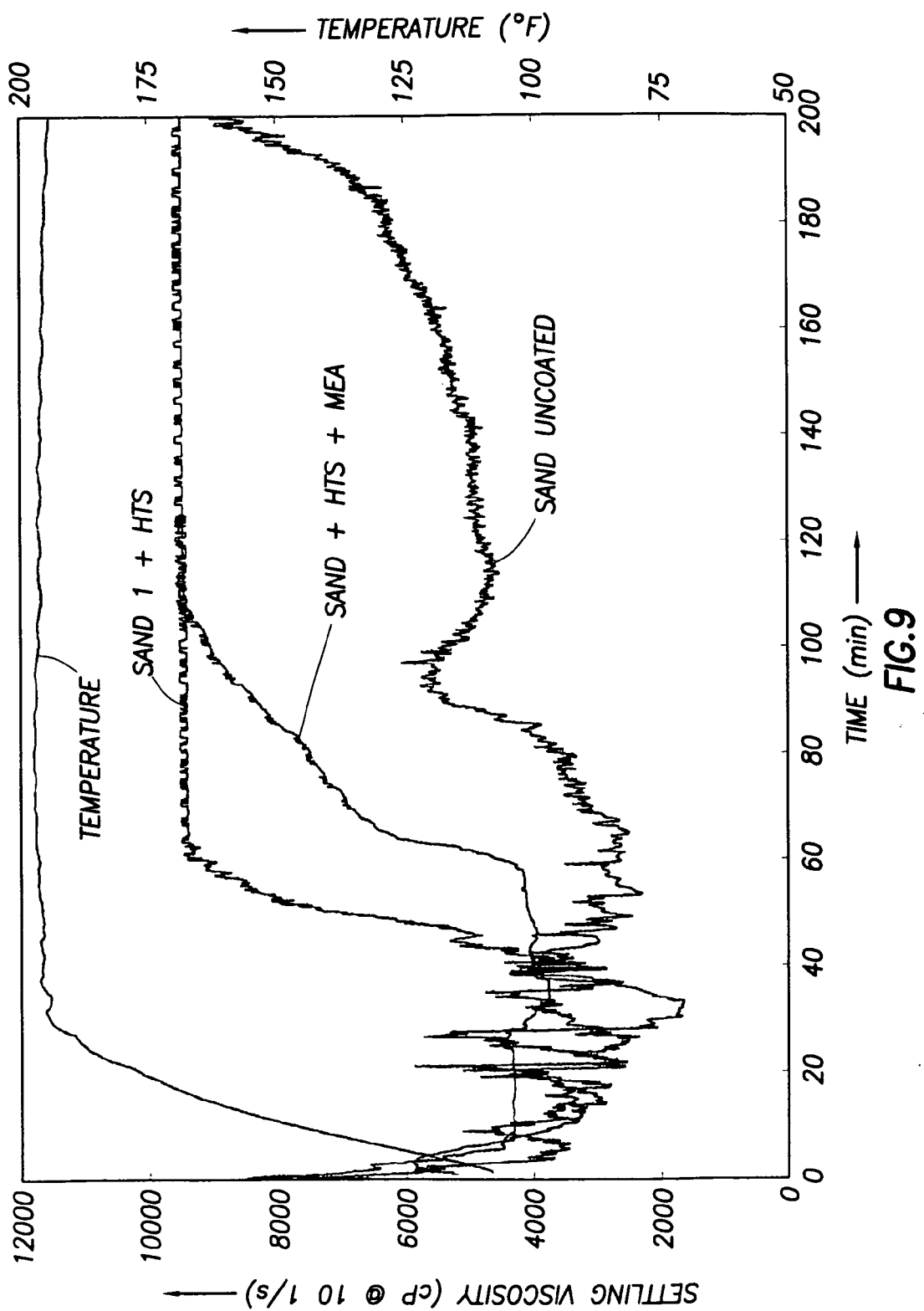
FIG. 9 is a graphical representation of the settling times measured with the slurry viscometer for a 25 lb/1,000 gal borate crosslinked guar fluid and 9 lb/gal proppants of uncoated sand, sand coated with 3% hydrophobic tackifying substance, and sand coated with 3% hydrophobic tackifying substance plus a microemulsion additive.

FIG. 9 shows curves from the slurry viscometer for 25 lb/1000 gallon borate crosslinked guar with the sand in its original state (i.e., uncoated), coated with HTS, and treated with MEA. In contrast to ceramic 1, there were larger differences between the settling properties of the original uncoated sand and the fully treated sand. Accordingly, it is believed that the effects of these treatments with HTS are due to agglomeration of the particles and that further treatment with MEA at least partially or substantially reduces the effects of agglomeration while still pacifying the proppant surface.

Example 5

It was believed that the settling behavior illustrated in FIGS. 3-5 may be due to slower oxidizer decomposition in the sand-laden fluid than in the ceramic-laden fluids. Accordingly, the sand-laden fluid may be retaining its viscosity longer than the ceramic-laden fluids. To test for oxidizer decomposition, sand or ceramic I were added to water without the polymer. The oxidizing breaker and the catalyst were also added to the water. Thereafter, the slurries were heated to 190° F. in a water bath. Aliquots were taken at various times. The concentration of the oxidizer in the fluids was determined by titration with potassium iodide in an acidic medium. The liberated iodide was titrated with standard sodium thiosulfate to a starch endpoint. The concentration of oxidizer was calculated from the results.

Figure 10:
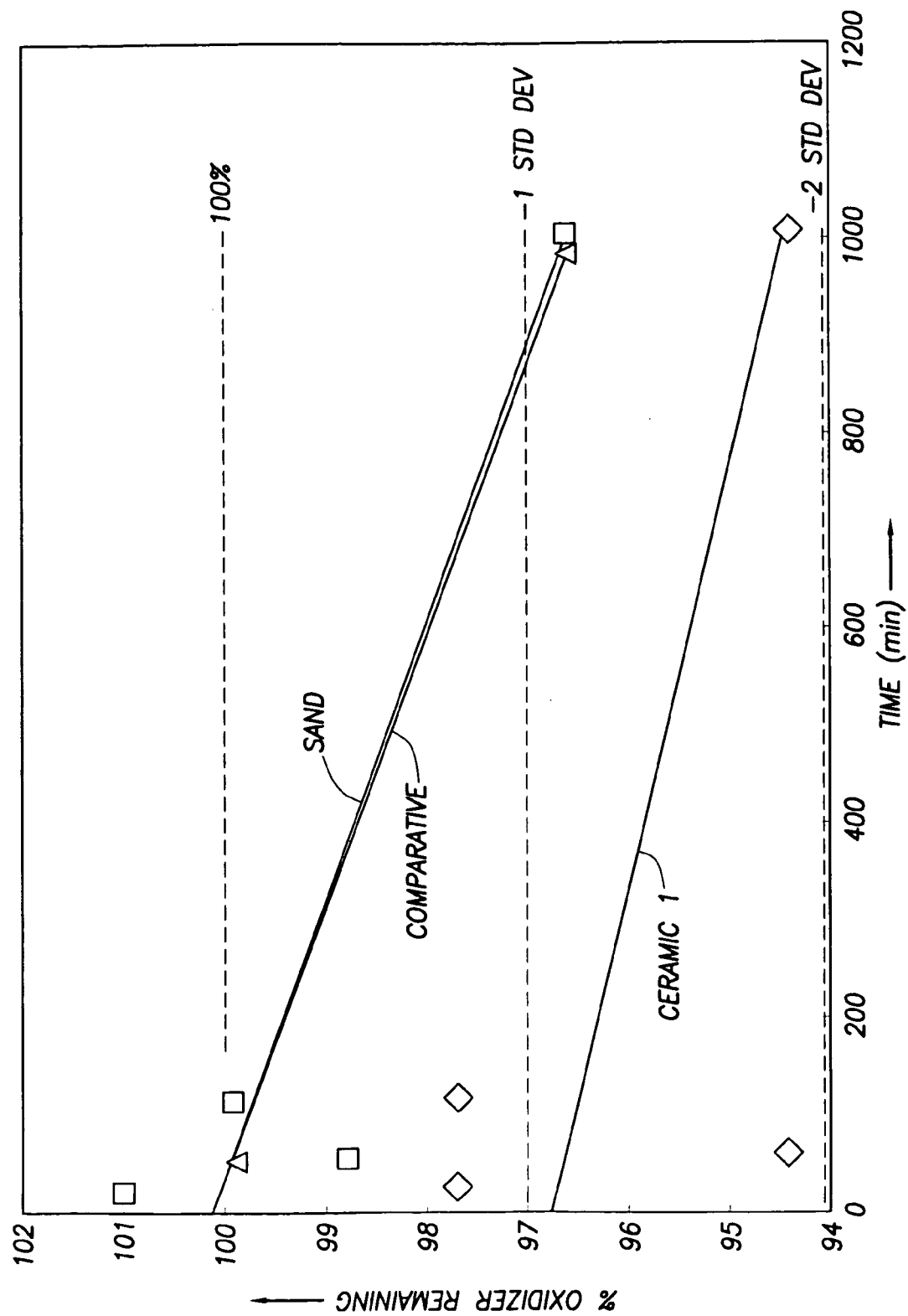
FIG. 10 is a graphical representation of testing the rate of loss of oxidizer from water-proppant slurries measured in de-ionized water at 190° F.

FIG. 10 shows the rate of loss of the oxidizer from the water-proppant slurries. As illustrated by FIG. 10, a comparative solution with no proppant had the same rate of loss of oxidizer as the sand-laden fluid, indicating the sand was inert to the decomposition. However, the oxidizer in the water with ceramic I decomposed at a significantly faster rate. Faster decomposition of the oxidizer would temporarily put a higher concentration of active oxidizer in solution causing a faster break of polymer in solution.

Example 6

Additional tests were performed to evaluate whether resin-coated proppants would have similar effects on the fluids as the ceramics. Several different resins were used in this series of tests.

Figure 11:
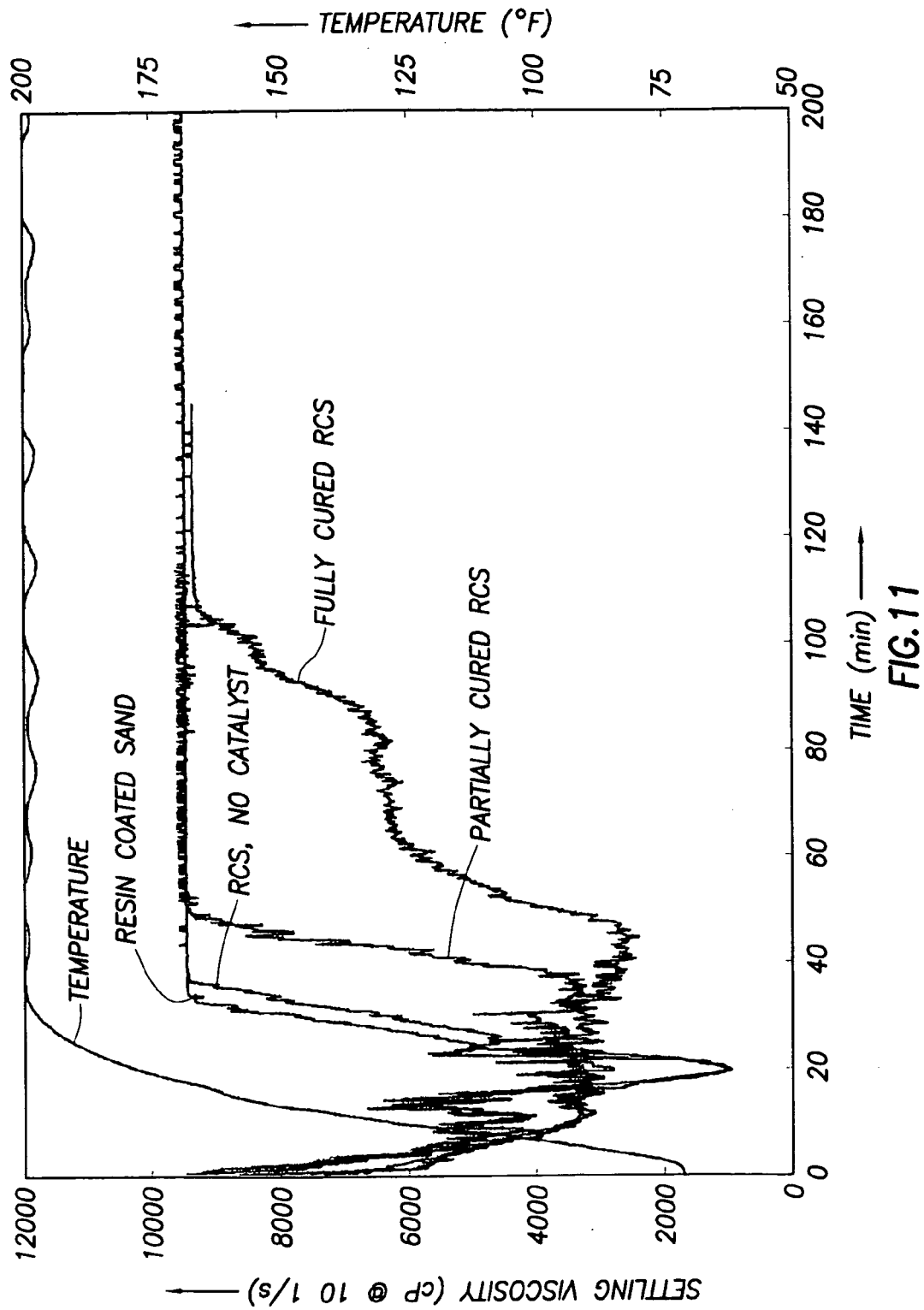
FIG. 11 is a graphical representation of the settling times measured with the slurry viscometer for a 25 lb/1,000 gal borate crosslinked guar fluid and 9 lb/gal proppants of resin-coated sands, one fully cured, one partially cured, and one fully cured without the transition metal catalyst.

FIG. 11 shows curves from the slurry viscometer for 25 lb/1000 gallon borate crosslinked guar with 9 lb/gallon resin-coated sands. The curable resin used in this series of tests was EXPEDITE 225™ resin, available from Halliburton Energy Services, Inc., Duncan, Okla. The curable resin should cure after depositing in the fracture with heat accelerating the cure. The partially cured resin used in this series of tests was Santrol Super HS, available from Santrol, Fresno, Tex. The fully cured resin used in this series of tests was Santrol Tempered HS, available from Santrol, Fresno, Tex. As illustrated by FIG. 11, the partially cured resin had substantially longer settling time, but was still accelerated compared to sand. The fully cured resin had a settling time that was longer than the ceramics and almost as long as sand.

Figure 12:
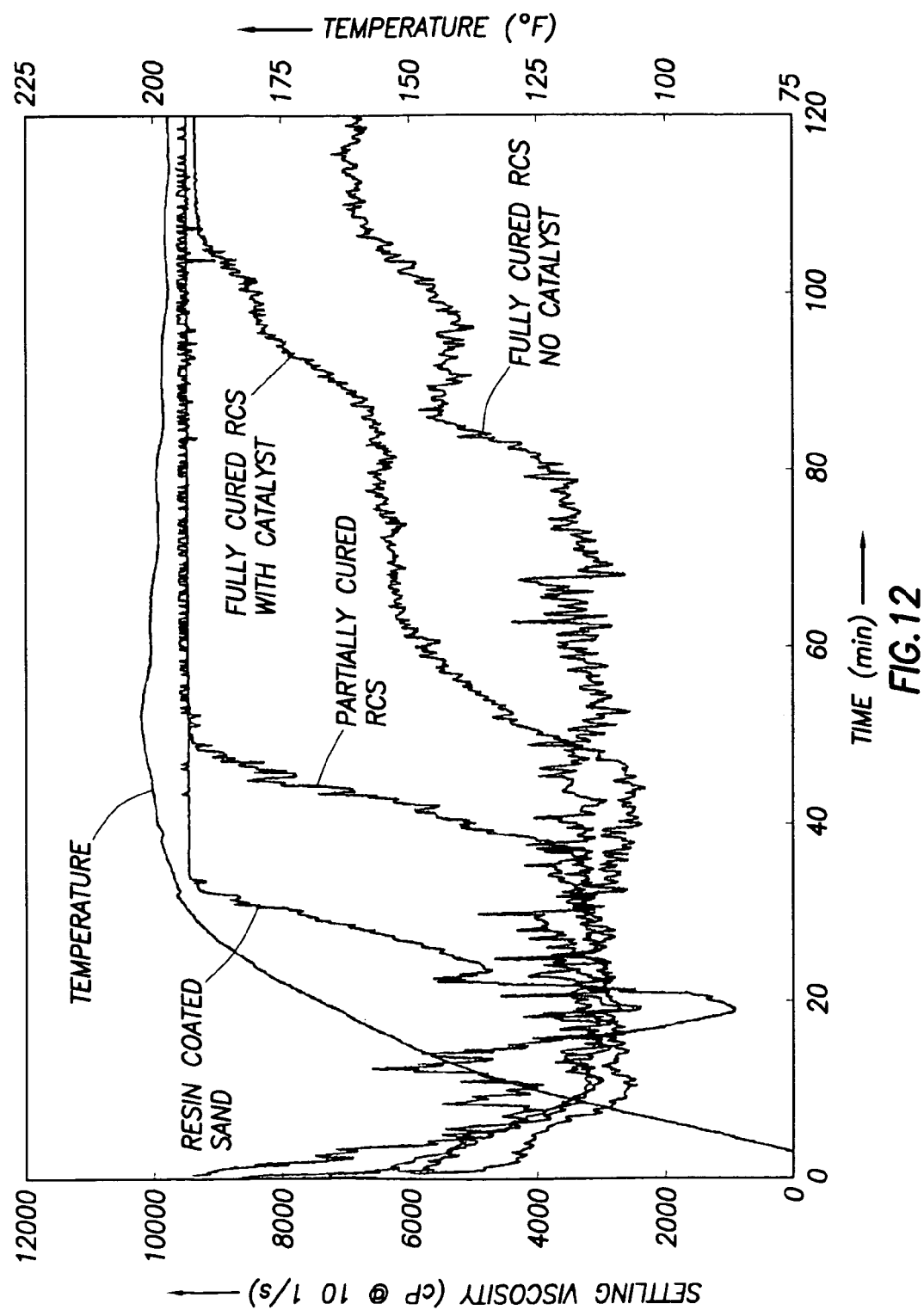
FIG. 12 is a graphical representation of the settling times measured with the slurry viscometer for a 25 lb/1,000 gal borate crosslinked guar fluid and 9 lb/gal proppants of several resin-coated sands, without the transition metal catalyst as compared to one with a transition metal catalyst.
Figure 13:
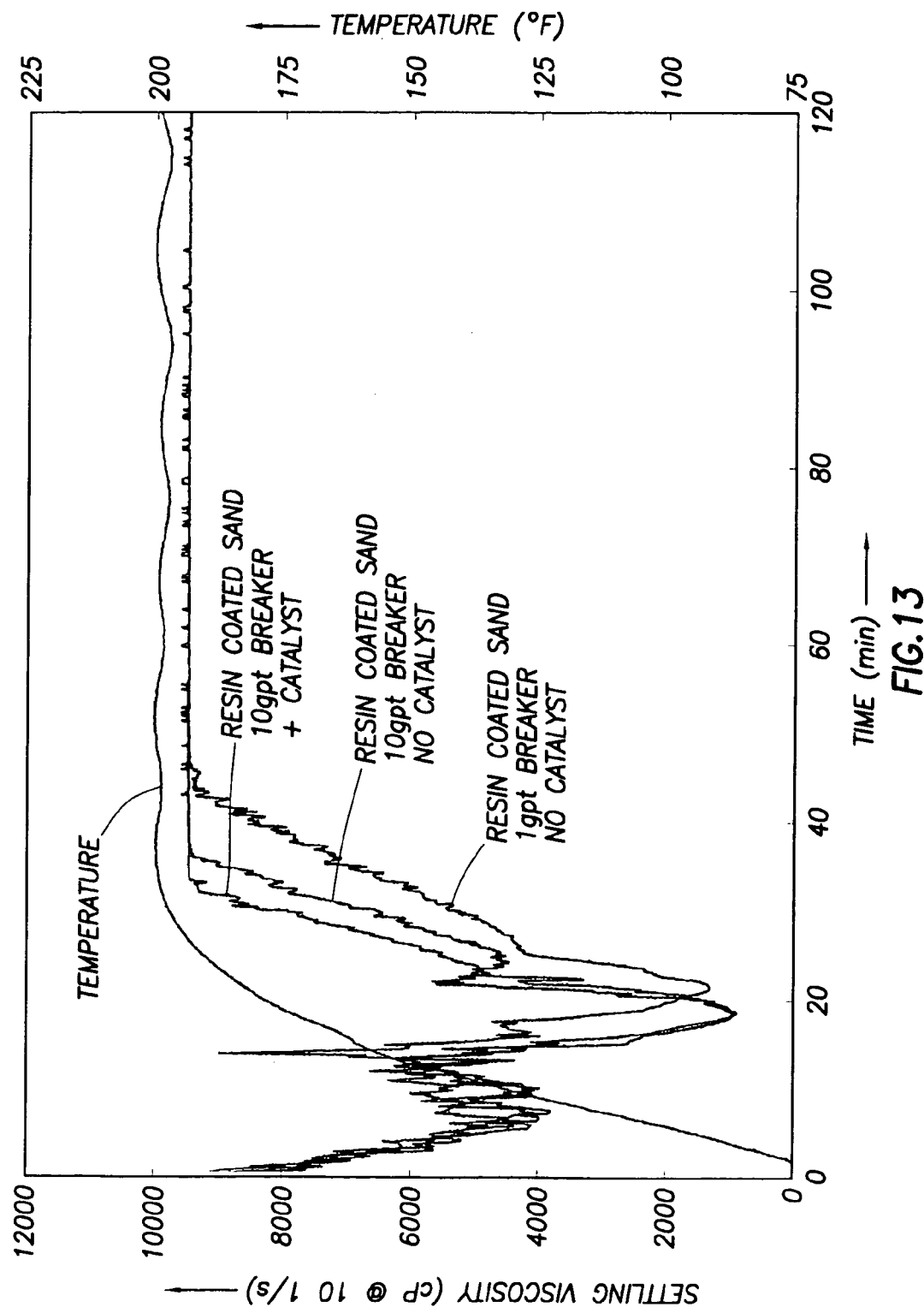
FIG. 13 is a graphical representation of the settling times measured with the slurry viscometer for a 25 lb/1,000 gal borate crosslinked guar fluid, one fluid with 10 gal oxidizing breaker and a transition metal catalyst, one fluid with the catalyst omitted, and one fluid with the oxidizing breaker reduced to 1 gal/1,000 gal.

FIG. 12 shows curves from the slurry viscometer for 25 lb/1000 gallon borate crosslinked guar with 9 lb/gal resin-coated sands. The curable resin used in this series of tests was EXPEDITE 225™ resin. The partially cured resin used in this series of tests was Santrol Super HS. The fully cured resin used in this series of tests was Santrol Tempered HS. As illustrated by FIG. 13, the curable resin had a rapid break and very quick settling time, as compared to the other resin-coated samples, indicating that ample material was extracted from the resin-coated sand to catalyze the breaker. The partially cured resin had a substantially longer settling time, but was still accelerated as compared to the sand. The fully cured resin had a settling time that was longer than the ceramics and almost as long as the sand. The transition-metal catalyst (copper EDTA) accelerated the break when added to the fully cured resin slurry.

FIG. 13 shows curves from the slurry viscometer for 25 lb/1000 gallon borate crosslinked guar with 10 gpt of the oxidizing breaker and a transition metal catalyst, with the catalyst omitted, and with the oxidizing breaker reduced to 1 gpt. The resin-coated sands for FIG. 13 were the same as for FIG. 12.

Therefore the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
providing a gelled base fluid;
measuring the viscosity of the gelled base fluid as a function of time in the presence of a proppant, the measuring being carried out for two or more proppants of differing chemical composition disposed in separate portions of the gelled base fluid; and
selecting a proppant for use in a fracturing operation based upon a viscosity needed to transport the proppant to a desired location in a fracture.

2. The method of claim 1, further comprising:
providing a fracturing fluid comprising the selected proppant; and
introducing the fracturing fluid into a subterranean formation at or above a pressure sufficient to create or enhance one or more fractures in the subterranean formation.

3. The method of claim 2, further comprising:
depositing the selected proppant in the one or more fractures.

4. The method of claim 1, wherein measuring the viscosity of the gelled base fluid as a function of time comprises quantitatively determining a settling time of each proppant.

5. The method of claim 1, wherein the viscosity is measured using a slurry viscometer.

6. The method of claim 1, wherein the selected proppant has a coating thereon.

7. The method of claim 1, further comprising:
determining a settling time of the proppant in each portion of the gelled base fluid; and
modifying the gelled base fluid or the selected proppant to alter the settling time of the selected proppant.

8. The method of claim 1, wherein the two or more different proppants have the same nominal size and density.

9. The method of claim 1, wherein the separate portions of the gelled base fluid comprise two or more different gelled base fluids.

10. A method comprising:
measuring the viscosity of a gelled base fluid as a function of time in the presence of a proppant, the measuring being carried out for two or more proppants of differing chemical composition disposed in separate portions of the gelled base fluid;
determining a settling time of the proppant in each portion of the gelled base fluid;
selecting a proppant for use in a treatment fluid based upon the settling time of the selected proppant; and
modifying the gelled base fluid or the selected proppant to alter the settling time of the selected proppant.

11. The method of claim 10, further comprising:
providing the treatment fluid; and
introducing the treatment fluid into a well bore.

12. The method of claim 10, wherein the viscosity is measured using a slurry viscometer.

13. The method of claim 10, wherein modifying the gelled base fluid or the selected proppant comprises coating the selected proppant.

14. The method of claim 10, wherein modifying the gelled base fluid or the selected proppant comprises adding a microemulsion additive to the gelled base fluid.

15. The method of claim 10, wherein modifying the gelled base fluid or the selected proppant comprises adjusting the type and/or concentration of an additive in the gelled base fluid.

16. The method of claim 10, wherein the two or more different proppants have the same nominal size and density.

17. The method of claim 10, wherein the separate portions of the gelled base fluid comprise two or more different gelled base fluids.

* * * * *